W. J. BURROWS.
PLUNGER SHAFT FOR SPRING AIR GUNS.
APPLICATION FILED JAN. 4, 1915.
1,150,248.
Patented Aug. 17, 1915.
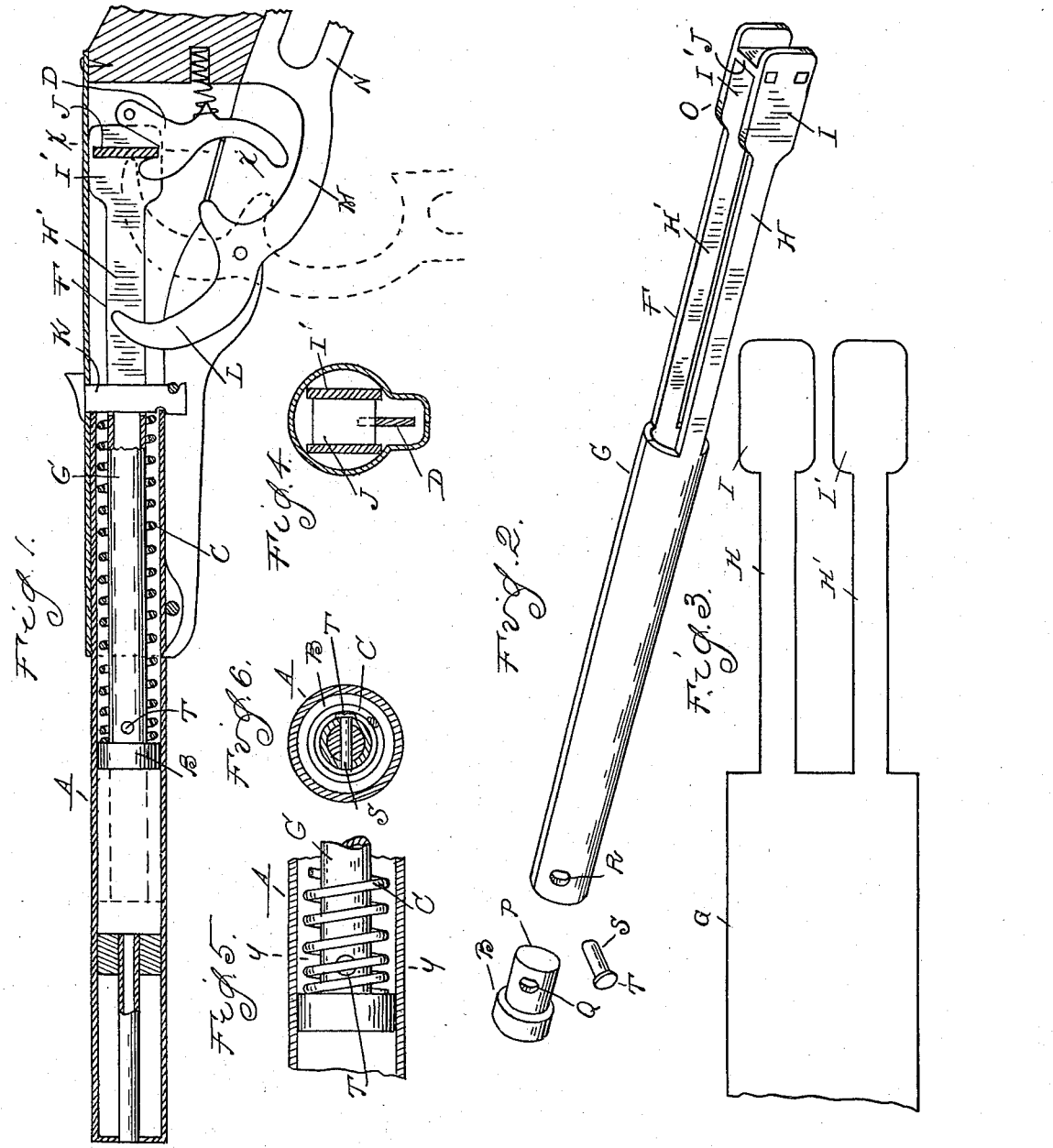
WITNESSES:
INVENTOR
William J. Burrows
BY
Whitmore Hulbert & Whitmore
ATTORNEYS

UNITED STATES PATENT OFFICE.

WILLIAM J. BURROWS, OF PLYMOUTH, MICHIGAN, ASSIGNOR TO DAISY MANUFACTURING COMPANY, OF PLYMOUTH, MICHIGAN, A CORPORATION OF MICHIGAN.

PLUNGER-SHAFT FOR SPRING AIR-GUNS.

1,150,248.  Specification of Letters Patent.  Patented Aug. 17, 1915.

Application filed January 4, 1915. Serial No. 447.

*To all whom it may concern:*

Be it known that I, WILLIAM J. BURROWS, a citizen of the United States of America, residing at Plymouth, in the county of Wayne and State of Michigan, have invented certain new and useful Improvements in Plunger-Shafts for Spring Air-Guns, of which the following is a specification, reference being had therein to the accompanying drawings.

The invention relates to spring air guns, and has among the objects thereof to obtain a simple and inexpensive construction of shank which may be formed of sheet metal; to provide a construction of shank which will not require special skill in assembling the parts in the barrel; to provide a construction of shank by which the life of the bearing block is materially increased; and further, to provide a simple and efficient connection between the plunger and the shank.

In the drawings, Figure 1 is a longitudinal section through an air gun to which my improvement is applied; Fig. 2 is a perspective view of the plunger shank; Fig. 3 is a plan of the blank from which the shank is formed; Fig. 4 is a section on the line $x-x$ of Fig. 1; Fig. 5 is a fragmentary enlarged view illustrating the connection between the plunger and the shank; Fig. 6 is a section on the line $y-y$ of Fig. 5.

A is the barrel of the air gun, B the piston or plunger, and C the spring.

D designates the trigger and F the plunger shank.

In the one embodiment of the invention shown in the drawings, the plunger shank is made from a sheet metal blank of the form shown in Fig. 3, and comprises a cylindrical portion G having its forward end attached to the plunger B and having at its rearward end prong portions H H'. These portions are arranged opposite each other, forming a bifurcation, and the ends of the prongs are enlarged as indicated at I I'. Arranged intermediate the enlarged portions I I' is a bearing block J secured thereto by riveting, or in any other suitable manner. This forms an enlarged head O at the rear end of the shank.

In the construction illustrated, the bifurcated portion of the shank is adapted to embrace the abutment K for the spring C, and the bearing block J extends rearwardly of the abutment K and is positioned to be engaged with the hooked end L of the spring-tensioning lever M. As shown in dotted lines in Fig. 1, when it is desired to retract the plunger the lever M is moved rearwardly by the hand-lever N until the bearing block J engages the trigger D, as indicated in full lines in Fig. 1.

The bearing block J is subjected to considerable wear and I have therefore so constructed the head O of the shank, and so formed the bearing block that by reversing the head a different portion of the block J will be presented to the lever M and the sear, thereby materially increasing the life of the bearing block. The reversibility of the shank has the additional feature of simplifying the assembling of the plunger parts within the barrel. Furthermore it is often necessary to detach the plunger parts from the barrel in order to repair parts, and this is frequently done by persons not skilled in the art. By having the head O reversible the danger of the parts being wrongfully reassembled, is eliminated.

As before stated, the portions I I' are enlarged and these portions are adapted to engage the barrel and form guides for the rear portion of the shank, as shown in Fig. 4.

Preferably the piston B is formed separate from the shank, as this allows the spring to be readily engaged with the shank, for as before stated, the head O is enlarged. As illustrated, the piston B is a short stud P which is inserted in the end of the shank, the latter and the stud having alining apertures Q and R for receiving a pin S. In assembling the parts the spring is sleeved upon the shank, the stud P engaged with the end of the shank and then the pin S inserted through the alined apertures Q R. When the shank and the parts carried thereby are positioned within the barrel, a coil of the spring C will overlie the head T of the pin S, as shown in Fig. 5, and hold the pin in place. This arrangement makes a very simple and efficient manner of attaching the piston to the shank.

While I have shown and described the preferred form of the invention, I do not desire to limit the protection to the particular structure illustrated.

What I claim as my invention is:—

1. The combination of a plunger shank for spring air guns, a piston having a stud telescopically engaging the end of the shank, there being alining apertures in the stud and shank and a pin inserted through the alined apertures, and a spring sleeved upon the shank and acting to hold the pin in place.

2. The combination of a plunger shank for air guns, of a piston, interengaging portions upon the piston and shank, a member for securing said interengaging portions together, and a spring upon the shank acting to retain said member in place.

3. In an air gun, the combination with the sear, of a bifurcated plunger shank, a bearing block engaged between the furcations of the shank, and a spring tensioning lever, the shank and bearing block being reversible as a unit to present different portions of said block for engagement with the sear and tensioning lever.

In testimony whereof I affix my signature in presence of two witnesses.

WILLIAM J. BURROWS.

Witnesses:
E. C. HOUGH,
F. F. BENNETT.

Copies of this patent may be obtained for five cents each, by addressing the "Commissioner of Patents, Washington, D. C."